United States Patent Office 3,655,791
Patented Apr. 11, 1972

3,655,791
DIMERIZATION OF DIOLEFINIC COMPOUNDS
Edwin L. De Young, Chicago, Ill., assignor to Universal Oil Products Company, Des Plaines, Ill.
No Drawing. Filed Oct. 7, 1970, Ser. No. 78,952
Int. Cl. C07c 3/10
U.S. Cl. 260—666 B                                6 Claims

ABSTRACT OF THE DISCLOSURE

Diolefinic compounds are dimerized in the presence of certain organo metallic halide catalysts at dimerization conditions to produce novel compositions of matter which are useful as aroma chemicals.

---

This invention relates to a process for the dimerization of olefinic compounds and particularly to a process for the dimerization of diolefinic hydrocarbons to produce compounds which are useful as aroma chemicals.

Heretofore, many aroma compositions such as perfumes, have depended, to a great extent, upon naturally occurring compounds which are blended or formulated to prepare final compositions of matter which have a pleasing and pleasant fragrance. For example, perfumes which comprise a mixture of organic compounds which include, for example, alcohols, aldehydes, ketones, esters, and hydrocarbons, are all combined in fixed proportion so that the odors of the fixed compounds will combine to produce a harmonious fragrance. Some of these compounds which are blended have been prepared from rose petals, geranium petals, or other flower petals which possess a distinctive fragrance; and thus, the product thereof, is dependent on nature as pertains to the growing season, the harvesting of the crops, as well as climatic conditions which will insure either an abundant crop or may in some instances, insure a poor or sparse crop of the desired flower. Therefore, in order to insure a continued and certain supply of various aromas, it is necessary to synthesize the compounds which possess the desired odor. By utilizing these synthetic compounds in place of the naturally occurring compounds, it is possible to prepare aroma chemicals which may be used in formulations thereafter used in the perfume and soap industry for preparing the formulations which are used to scent soaps, detergents, talcums, perfumes, colognes, etc.

In this respect, it has now been discovered that certain hydrocarbons, and particularly a diolefinic hydrocarbon such as isoprene, may be treated in the presence of certain catalysts of the type hereinafter set forth in greater detail to prepare novel compositions of matter which possess distinctive, desirable, and pleasing odors.

It is therefore an object of this invention to prepare novel compositions of matter hereinafter set forth in greater detail.

A further object of this invention is to provide a process for effecting the polymerization and particularly the dimerization of certain diolefinic hydrocarbons to prepare novel compositions of matter useful in the fragance field.

In one aspect, an embodiment of this invention resides in a process for the dimerization of a diolefinic compresence of a catalyst consisting of (1) a cycloalkadienyl pound which comprises treating said compound in the titanium trihalide and (2) a trialkyl aluminum at dimerization conditions and recovering the resultant dimer.

A specific embodiment of this invention is found in the process for dimerization of isoprene which comprises treating said isoprene in the presence of cyclopentadienyl titanium trichloride and trimethyl aluminum at a temperature in the range from about 25° to about 250° C. and a pressure in the range of from about atmospheric to about 100 atmospheres, and recovering the resultant mixture comprising 2,6-dimethyl-1,6-octadiene, 2,6-dimethyl-4,7-octadiene and 1-methyl-4-isopropenylcyclohexene-1.

Other objects and embodiments will be found in the following further detailed description of the present invention.

As hereinbefore set forth the present invention is concerned with the process for the dimerization of unsaturated compounds, and particularly diolefinic hydrocarbons, in the presence of certain catalytic compositions of matter at dimerization conditions to provide compounds which are useful in the aroma industry. The catalytic compositions of matter which are used to effect the dimerization of the unsaturated compounds comprise organo metallic halides in which the organo portion of the catalyst comprises a cycloalkyldienyl radical and the metallic component consists of titanium. Some specific examples of these catalysts will include cyclopentadienyl titanium trihalides, cyclopentadienyl titanium tribromide, cyclohexadienyl titanium trichloride, cyclohexadienyl titanium tribromide, etc. It is also contemplated within the scope of this invention that the triodo analogs of the aforementioned compounds may also be used, although not necessarily with equivalent results. In addition, a trialkyl aluminum compound in which the alkyl portion of the compound contains from 1 to about 4 carbon atoms is also present as a reduction agent for the organo metallic halide catalyst. Examples of these trialkyl compounds which may be used will include trimethyl aluminum, triethyl aluminum, tri-n-propyl aluminum, triisopropyl aluminum, tri-n-butyl aluminum, tri-t-butyl aluminum etc., the preferred compounds comprising trimethyl aluminum or triethyl aluminum due to their more ready availability and corresponding lower costs. The dimerization conditions under which the reaction is effected will include temperatures ranging from ambient (about 25° C.) up to about 250° C. or more and at a pressure in the range from atmospheric up to about 100 atmospheres or more. It is contemplated that when utilizing a reaction temperature which is in the upper portion of the range hereinbefore set forth, the reaction may also be effected at superatmospheric pressures, the amount of pressure which is utilized being that which is necessary to maintain a major portion of the diolefinic hydrocarbon in a liquid phase. If these superatmospheric pressures are to be utilized, the pressure is provided for by the introduction of a substantially inert gas such as nitrogen into the reaction zone. In addition to the aforementioned dimerization conditions of temperature and pressure, the reaction dimerization conditions will also include a reaction time which may range from about 0.5 up to about 24 hours or more in duration, the time which is required to effect the dimerization of the diolefinic compound being dependent upon a number of variable conditions or factors among which will include the particular reactant undergoing dimerization, the reaction temperature, and the reaction pressure, etc.

Examples of unsaturated compounds, and particularly diolefinic hydrocarbons which may be dimerized according to the process of this invention will include straight chain diolefins such as 1,2-butadiene, 1,3-pentadiene, 1,3-hexadiene, 1,4-hexadiene, 2,4-hexadiene, 1,3-heptadiene, 1,4-heptadiene, 1,5-heptadiene, 2,4-heptadiene, 1,3-octadiene, 1,4-octadiene, 1,5-octadiene, 1,7-octadiene, 2,4-octadiene, 2,5-octadiene, etc.; branched chain olefinic hydrocarbons such as 2-methyl-1,3-butadiene (isoprene), 2,3 - dimethyl - 1,3 - butadiene, 2-methyl-1,3-pentadiene, 3-methyl - 1,3 - pentadiene, 2,3-dimethyl-1,3-pentadiene, 2-methyl-1-hexadiene, 2-methyl-1,4-hexadiene, 3-methyl-1,3-hexadiene, 2-methyl-2,4-hexadiene, 3-methyl-2,4-hexadiene, 2-methyl-1,3-heptadiene, 3-methyl-1,3-heptadiene, 2-methyl-1,4-heptadiene, 2-methyl-1,5-heptadiene, 3-methyl-2,4-heptadiene, 2-methyl-1,3-octadiene, 2-methyl-1,7-octadiene, 3-methyl-2,7-octadiene, etc. It is to be understood that the aforementioned diolefinic hydrocarbons are only representative of the class of compounds which may be subjected to a dimerization reaction, and that the present invention is not necessarily limited thereto.

The process of this invention in which the diolefinic hydrocarbon is subjected to dimerization in the presence of certain catalytic compositions of matter may be effected in any suitable manner and may comprise a batch or continuous type of operation. For example, when a batch type operation is used a quantity of the diolefinic hydrocarbon such as isoprene is placed in a reaction vessel, the particular make-up of the vessel being dependent upon whether superatmospheric pressures are to be employed to effect the reaction. For example, when utilizing a reaction which is to be effected at superatmospheric pressure, the diolefinic hydrocarbon such as isoprene is charged to an autoclave which may be of the rotating or mixing type which contains the organo metallic halide catalyst of the type hereinbefore set forth in greater detail. In addition, the reactor will also contain a trialkyl reducing agent, said reducing agent being present in a mol ratio in a range from about 1:1 to about 2:1 mols of reducing agent per mol of organo metallic halide catalyst. The vessel is thereafter sealed, nitrogen is pressed in until the desired operating pressure has been reached and the vessel is then heated to the desired operating temperature. Upon completion of the predetermined residence time, the vessel and contents thereof are allowed to return to room temperature, the excess pressure is vented and the reaction mixture is recovered. The reaction mixture, after separation from the catalyst, is then subjected to conventional means of separation and recovery, said means including washing, drying, extraction, fractional distillation under reduced pressure, etc., whereby the desired dimer is separated from any unreacted starting materials and/or side products which may have been formed during the reaction.

It is also contemplated within the scope of this invention that the dimerization process may be effected in a continuous manner of operation. For example, one particular type of continuous type of operation which may be employed comprises the fixed bed type in which the catalyst is disposed as a fixed bed in the reaction zone which is maintained at the proper operating conditions of temperature and pressure. In addition, the trialkyl aluminum reducing agent is also present along with the organo metallic halide catalyst. The diolefinic hydrocarbon which is to undergo dimerization is then continuously charged to the reaction zone and passed through the fixed bed of the catalyst and reducing agent in either an upward or downward flow. Upon completion of the desired residence time the reactor effluent is continuously withdrawn from the reactor and subjected to separation means similar in nature to the type hereinbefore set forth whereby the dimers which comprise the desired reaction product are separated and recovered from unwanted dimers, side reaction products which may have been formed, and unreacted diolefinic hydrocarbons, the latter being recycled to form a portion of the feed stock. In addition, it is also contemplated that other continuous methods of operation may also be employed including the moving bed type in which the catalyst and reducing agent as well as the diolefinic hydrocarbon undergoing dimerization will pass through the reaction zone either concurrently or countercurrently to each other, or the slurry type operation in which the reactant is carried into the reaction zone as a slurry with the diolefinic hydrocarbon. In both of these continuous types of operation, the reactor effluent is continuously withdrawn from the reaction zone and treated in a manner similar to that described for the treatment of the reactor effluent from the fixed bed type of operation, the desired dimers being recovered while the unreacted diolefinic hydrocarbons are recycled to the reaction zone to form a portion of the feed stock.

The following examples are given to illustrate the process of the present invention which, however, are not intended to limit the generally broad scope of the present invention in strict accordance therewith.

EXAMPLE I

In this experiment 68 g. (1.0 mol) of isoprene was placed in a 300 ml. bomb along with 2.4 g. (0.011 mol) of cyclopentadienyl titanium trichloride and 25 cc. (0.022 mol) of a 15% triethyl aluminum solution in toluene. The bomb was sealed and heated to a temperature of 80° C. for a period of 12 hours. At the end of the 12 hour period, the autoclave and contents thereof were allowed to cool to room temperature. The reaction product was recovered, hydrolyzed, filtered and evaporated down to an orange, pleasant smelling liquid which weighed 30.0 g. The solution was then subjected to analysis by means of a gas-liquid chromatograph and was found to contain 2,6-dimethyl-1,6-octadiene, 2,6-dimethyl-4,7-octadiene and 1-methyl-4-isopropylcyclohexene-1.

EXAMPLE II

To illustrate the necessity for a particularly type of organo metallic halide catalyst, a second experiment was performed in which 100 cc. (1.0 mol) of isoprene and 2.75 g. (0.011 mol) of dicyclopentadienyl titanium dichloride along with 25 cc. (0.022 mol) of a 15% triethyl aluminum solution in toluene were placed in a bomb. The bomb was sealed and heated to a temperature of 80° C., being maintained thereat for a period of 12 hours. At the end of this time, heating was discontinued, the autoclave was allowed to return to room temperature and the reaction mixture was recovered. However, analysis of the product disclosed traces of limonene.

EXAMPLE III

When isoprene is treated in a similar manner with catalytic amounts of a catalyst complex comprising cyclopentadienyl titanium tribromide using trimethyl aluminum as the reducing agent a at temperature of 80° C., the desired product comprising a mixture of 2,6-dimethyl-1,6-octadiene, 2,6-dimethyl-4,7-octadiene and 1-methyl-4-isopropylpentylcyclohexene-1, will be recovered.

I claim as my invention:
1. A process for the dimerization of a $C_4$–$C_9$ diolefinic hydrocarbon which comprises treating said diolefin with a catalyst consisting of (1) a cycloalkadienyl titanium trihalide and (2) a trialkyl aluminum at 25–250° C. and at a pressure of from about atmospheric to about 100 atmospheres and recovering the resultant dimer.
2. The process as set forth in claim 1 in which said cycloalkadienyl titanium trihalide is cyclopentadienyl titanium trichloride.
3. The process as set forth in claim 1 in which said cycloalkadienyl titanium trihalide is cyclopentadienyl titanium tribromide.
4. The process as set forth in claim 1 in which said trialkyl aluminum is trimethyl aluminum.

5. The process as set forth in claim 1 in which said trialkyl aluminum is triethyl aluminum.

6. The process as set forth in claim 1 in which said diolefinic compound is isoprene and the resultant dimer is a mixture of 2,6-dimethyl-1,6-octadiene, 2,6-dimethyl-4,7-octadiene and 1-methyl-4-isopropenylcyclohexene-1.

References Cited

UNITED STATES PATENTS

| | | | |
|---|---|---|---|
| 3,510,536 | 5/1970 | Brennan | 260—680 B |
| 3,549,717 | 12/1970 | Itakura | 260—666 B |
| 3,530,197 | 9/1970 | McClure | 260—680 B |
| 3,476,820 | 11/1969 | Furukawa et al. | 260—666 B |
| 3,444,254 | 5/1969 | Herwig | 260—666 B |
| 3,280,205 | 10/1966 | Yosida et al. | 260—666 B |
| 3,214,484 | 10/1965 | Wittenberg et al. | 260—666 B |
| 3,157,708 | 11/1964 | Munley et al. | 260—666 B |
| 3,149,173 | 9/1964 | Wittenberg et al. | 260—666 B |

DELBERT E. GANTZ, Primary Examiner

V. O'KEEFE, Assistant Examiner

U.S. Cl. X.R.

260—680 B